United States Patent
Fallon et al.

(10) Patent No.: US 9,684,349 B2
(45) Date of Patent: Jun. 20, 2017

(54) SYSTEM AND METHOD FOR CONFIGURING UPS OUTLETS

(71) Applicant: SCHNEIDER ELECTRIC IT CORPORATION, West Kingston, RI (US)

(72) Inventors: Raymond M. Fallon, Galway (IE); Alan Dean Smith, Galway (IE); Orla Conroy, Co. Mayo (IE)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 49 days.

(21) Appl. No.: 14/779,142

(22) PCT Filed: Mar. 31, 2013

(86) PCT No.: PCT/US2013/034744
§ 371 (c)(1),
(2) Date: Sep. 22, 2015

(87) PCT Pub. No.: WO2014/163604
PCT Pub. Date: Oct. 9, 2014

(65) Prior Publication Data
US 2016/0054771 A1 Feb. 25, 2016

(51) Int. Cl.
*G06F 1/26* (2006.01)
*H02J 9/06* (2006.01)

(52) U.S. Cl.
CPC ............... *G06F 1/26* (2013.01); *H02J 9/062* (2013.01)

(58) Field of Classification Search
CPC ................................. G06F 1/266; H02J 9/062
See application file for complete search history.

(56) References Cited

U.S. PATENT DOCUMENTS 8,639,953 B2  1/2014  Spitaels et al.
2009/0251002 A1  10/2009  Cohen et al.
(Continued)

FOREIGN PATENT DOCUMENTS

WO  2010110940 A1  9/2010

OTHER PUBLICATIONS

Extended European Search Report for European application No. 13880706.0 dated Oct. 6, 2016.
(Continued)

*Primary Examiner* — Albert Wang
(74) *Attorney, Agent, or Firm* — Lando & Anastasi, LLP

(57) ABSTRACT

A system for configuring outlet groups on an uninterruptible power supply (UPS) is provided. The system includes a computer system connected via a communication link to the UPS. The computer system includes a memory and at least one processor coupled to the memory. The at least one processor is configured to receive data pertaining to at least one device, receive data pertaining to a plurality of outlet groups associated with the UPS, determine one configuration profile for the at least one device, the one configuration profile being included in a plurality of configuration profiles, determine one outlet group of the plurality of outlet groups, the one outlet group being configured for the one configuration profile, associate the one configuration profile with the one outlet group and provide an instruction for a user to connect the at least one device in an outlet included in the one outlet group.

20 Claims, 6 Drawing Sheets

(56) References Cited

U.S. PATENT DOCUMENTS

| | | | |
|---|---|---|---|
| 2011/0101777 A1 | 5/2011 | Jansma | |
| 2011/0298286 A1 | 12/2011 | Batzler et al. | |
| 2012/0246492 A1* | 9/2012 | Ho | G06F 1/266 |
| | | | 713/300 |
| 2013/0076132 A1 | 3/2013 | Cohen et al. | |
| 2013/0246814 A1* | 9/2013 | Hsieh | G06F 1/30 |
| | | | 713/300 |

OTHER PUBLICATIONS

Whiting. "Switched Outlet Groups on SMT and SMX Smart-UPS," APC Application Note 165, pp. 1-8. 2011. Retrieved on [Jun. 29, 2013]. retrieved from the internet: <URL: http://www.apcmedia.com/salestools/NWHG-8ACJSRINWHG-8ACJSR_RO_EN.pdf>entire document.

Notification of Transmittal of the International Search Report and the Written Opinion of the International Searching Authority from corresponding PCT/US2013/034744 dated Jul. 12, 2013.

* cited by examiner

SYSTEM AND METHOD FOR CONFIGURING UPS OUTLETS

CROSS-REFERENCE TO RELATED APPLICATIONS

This application is a U.S. National Stage Application under 35 U.S.C. §371 of International Application No. PCT/US2013/034744, filed Mar. 31, 2013, titled SYSTEM AND METHOD FOR CONFIGURING UPS OUTLETS, which is hereby incorporated herein by reference in its entirety.

BACKGROUND

Technical Field

The present disclosure relates to systems and methods for providing uninterruptible power, and more particularly, to methods and systems used to configure outlets on a power device, such as an uninterruptible power supply (UPS).

Discussion

An uninterruptible power supply (UPS) is a type of power supply used to power and protect an electrical load that is sensitive to fluctuations in, or the absence of, electrical power. A load can be any device connected to the UPS, such as computing devices, networking devices, and any other electronic devices. The UPS can be connected between the load and a source of electrical power, such as a main power source or other commercially provided electric power. The UPS uses commercially supplied AC power to charge a DC battery and provide the AC power to load. Upon outages of power, the load draws its AC power from the DC battery through a DC to AC inverter. UPS devices are commonly connected to loads, to protect the loads from power fluctuations, and to provide the user with backup power should the primary power source be lost, and to enable the user to "gracefully" shut down any applications that are running, as the backup power is depleted.

Various processes and software applications, such as UPS management systems available from American Power Conversion (APC) Corporation by Schneider Electric of West Kingston, R.I., have been developed to aid users in configuring and managing UPS devices. Thus, conventional tool sets provide users with a standardized and predictable UPS management methodology.

SUMMARY

According to at least one embodiment, a system for configuring outlet groups on an uninterruptible power supply (UPS) is provided. The system includes a computer system connected via a communication link to the UPS. The computer system includes a memory and at least one processor coupled to the memory. The at least one processor is configured to receive data pertaining to at least one device, receive data pertaining to a plurality of outlet groups associated with the UPS, determine one configuration profile for the at least one device, the one configuration profile being included in a plurality of configuration profiles, determine one outlet group of the plurality of outlet groups, the one outlet group being configured for the one configuration profile, associate the one configuration profile with the one outlet group and provide an instruction for a user to connect the at least one device in an outlet included in the one outlet group.

In the system, the at least one processor may be configured to display a visual representation of the UPS to the user, the visual representation including a visual representation of the plurality of outlet groups, the visual representation of the plurality of outlet groups including at least one visual representation of an outlet of at least one outlet group of the plurality of outlet groups. The at least one processor may be configured to provide the instruction for the user to connect the at least one device in the outlet via the visual representation. The at least one processor may be configured to associate at least one of a plurality of priority levels with at least one of the plurality of configuration profiles, wherein the plurality of priority levels ranges from a lowest priority level to a highest priority level. The plurality of configuration profiles may include configuration settings. The configuration settings may include at least one of critical load information, graceful shutdown information, turn-on delay information, stay-off delay information and turn-off delay information.

In the system, the at least one processor may be configured to determine whether a first outlet group and a second outlet group are associated with at least one profile of the plurality of configuration profiles, wherein the second outlet group is dependent on the first outlet group. The at least one processor may be configured to determine whether the first outlet group is preferably assignable by the one configuration profile and associate the at least one device with the first outlet group, if the first outlet group is preferably assignable by the one configuration profile. The at least one processor may be configured to determine whether the one configuration profile is already associated with an outlet group of the plurality of outlet groups and associate the at least one device with the outlet group, if the one configuration profile is already associated with the outlet group. The at least one processor may be configured to determine whether at least one free outlet group is included in the plurality of outlet groups and associate the at least one device with the at least one free outlet group, if there is at least one free outlet group in the plurality of outlet groups. The at least one processor may be configured to associate another device already assigned to the one outlet group to another outlet group, if there are no free outlet groups in the plurality of outlet groups and the another device has a lower priority level than the at least one device.

According to another embodiment a method for configuring outlet groups on a UPS is provided. The method includes acts of receiving data pertaining to at least one device; receiving data pertaining to a plurality of outlet groups associated with the UPS; determining, by a processor, one configuration profile for the at least one device, the one configuration profile being included in a plurality of configuration profiles; determining, by the processor, one outlet group of the plurality of outlet groups configured for the one configuration profile; associating the one configuration profile with the one outlet group; and providing an instruction for a user to connect the at least one device in an outlet included in the one outlet group.

The method may further include acts of displaying a visual representation of the UPS to the user, the visual representation including a visual representation of the plurality of outlet groups, the visual representation of the plurality of outlet groups including at least one visual representation of an outlet of at least one outlet group of the plurality of outlet groups and providing the instruction for the user to connect the at least one device in the outlet via the visual representation. The method may further include an act of associating a plurality of priority levels with the plurality of configuration profiles, wherein the plurality of priority levels ranges from a lowest priority level to a highest priority level. The method may further include an act of configuring the plurality of configuration profiles to include configuration settings, the configuration settings including at least one of critical load information, graceful shutdown information, turn-on delay information, stay-off delay information and turn-off delay information. The method may further include an act of determining whether a first outlet group and a second outlet group are associated with at least one profile of the plurality of configuration profiles, wherein the second outlet group is dependent on the first outlet group.

The method may further include acts of determining whether the first outlet group is preferably assignable by the one configuration profile and associating the at least one device with the first outlet group, if the first outlet group is preferably assignable by the one configuration profile. The method may further include acts of determining whether the one configuration profile is already associated with an outlet group of the plurality of outlet groups and associating the at least one device with the outlet group, if the one configuration profile is already associated with the outlet group. The method may further include acts of determining whether at least one free outlet group is included in the plurality of outlet groups and associating the at least one device with the at least one free outlet group, if there is at least one free outlet group in the plurality of outlet groups. The method may further include an act of associating another device already assigned to the one outlet group to another outlet group, if there are no free outlet groups in the plurality of outlet groups and the another device has a lower priority level than the at least one device.

According to another embodiment, a non-transitory computer readable medium is provided. The computer readable medium stores sequences of instruction for configuring outlet groups on an uninterruptible power supply (UPS). The sequences of instruction include instructions that will cause a processor to receive data pertaining to at least one device; receive data pertaining to a plurality of outlet groups associated with the UPS; determine one configuration profile for the at least one device, the one configuration profile being included in a plurality of configuration profiles; determine one outlet group of the plurality of outlet groups configured for the one configuration profile; associate the one configuration profile with the one outlet group; and provide an instruction for a user to connect the at least one device in an outlet included in the one outlet group.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the embodiments disclosed herein. In the drawings:

DETAILED DESCRIPTION

Figure 1:
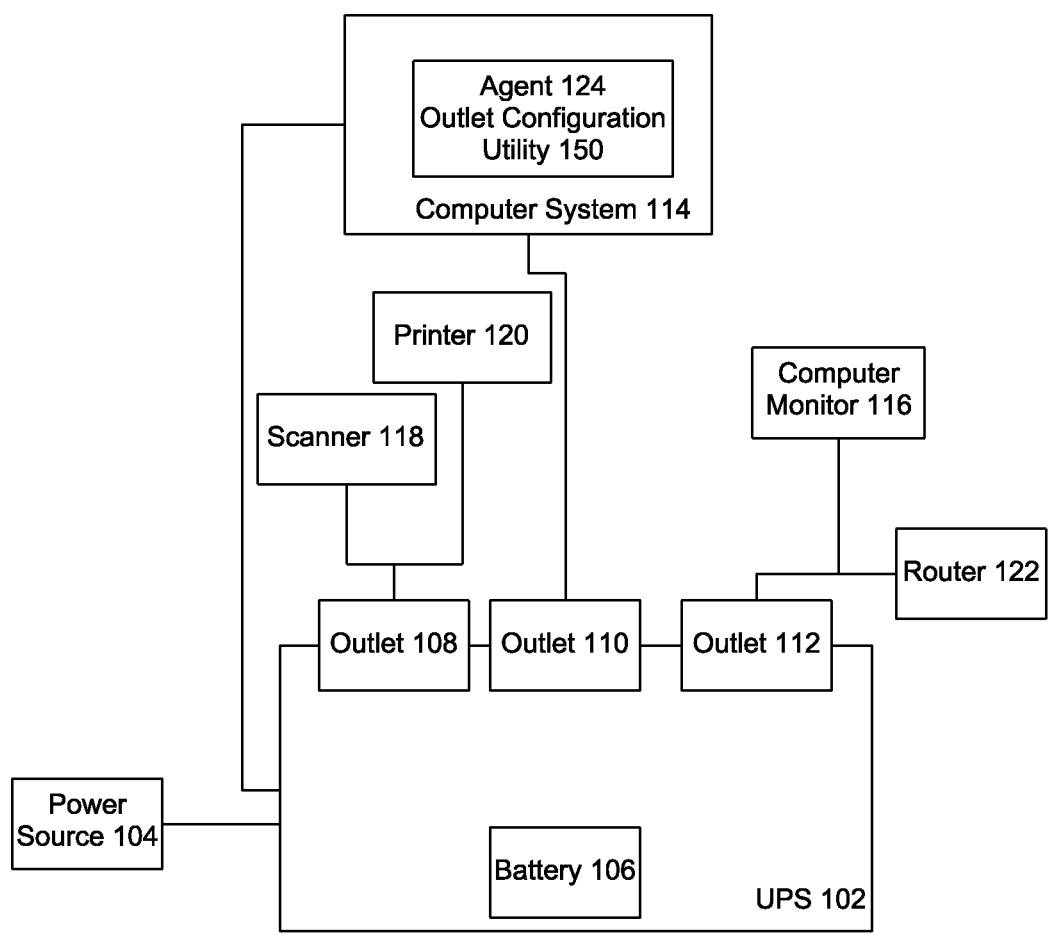
FIG. 1 is a block diagram of a UPS according to one embodiment within the context of other devices.

Modern UPS devices may include multiple outlet groups or banks that are controlled and metered independently, which can be used to manage and control loads as needed. Some UPS devices have outlet groups that switch totally independent of each other, while other UPS devices have outlet groups that depend upon other outlet groups. For instance, an example UPS may include a Main Outlet Group (MOG) and a Switched Outlet Group (SOG). In this example, the MOG powers the SOG, so devices in the MOG may be turned on before the devices in the SOG. Additionally, the devices in the MOG may be the last devices to be switched off.

UPS management devices such as the Network Management Card (NMC) available from American Power Conversion (APC) Corporation by Schneider Electric of West Kingston, R.I., allow for secure monitoring and control of individual UPS devices via various interfaces provided. In some examples, software suites like PowerChute Business Edition also available from American Power Conversion (APC) Corporation by Schneider Electric of West Kingston, R.I., provide UPS management, safe system shutdown and innovative energy management capabilities. These products and software suites may provide for a user to configure UPS outlet groups such as the MOG, SOG and any other groups.

For example, in a series of screens the user can name the outlet groups and configure the shut down delays associated with each group. First, the user can navigate to the outlet setup screen to configure which outlet group is powering one of the connected devices. Other UPS configurations rely on the customer understanding the UPS configuration and particular terminology of the software suite, and then correctly selecting the outlet group powering the server. Second, the user can visit another screen to configure the correct shutdown and startup settings for each outlet or outlet group along with other outlet group settings. It is vital for the user to correctly configure the correct shutdown and reboot sequence for the outlet group supplying power to critical devices. Finally, the user can visit a load shedding screen to configure the priority for turning off outlet groups when certain conditions apply. Load shedding enables a UPS to preserve battery power for critical equipment and thus is an important function of the UPS when the main power source is not available. It is essential that the user knows which equipment is connected to each outlet group as safe shutdown is not guaranteed without the correct connection.

Thus, to correctly configure the UPS, the user needs to have a good technical understanding of the UPS functionality and configuration settings, the device requirements in terms of criticality of their load and the appropriate shutdown configuration and the configuration terminology including Main Outlet Groups, Switched Outlet Groups, Graceful Shutdown delays, as well as other terminology. However, when a user takes a UPS out of the box, the user may not know which devices should be plugged into what outlet groups and what settings need to be configured and further many not have the complex understanding of the appropriate configurations and terminology.

Further, even with some understanding of the configurations and terminology, it has proven to be challenging for users to enter appropriate values into the configuration fields, as they are confusing and necessitating the user to know how UPS outlet groups function and interact. In addition, with increased functionality provided by the UPS, it can be more confusing for users to know how to properly set up the UPS and which outlets to use. As a result, the UPS configuration process may be manual and error prone, resulting in the user configuring the groups and the associate devices incorrectly.

As a result of incorrect configurations, some of the UPS devices can cause critical loads to be dropped prematurely. For example, if a server were to be connected to a Main Outlet Group and a network router were connected to a Switched Outlet Group, the Switched Outlet Group turning off before the Main Outlet Group can cause the network router to be prematurely shut down. In this example, if the server was to send a notification over the network, it would be unable to do so because the router was powered down.

Further, the typical UPS configuration software does not recommend changes to the outlets associated with devices for the UPS to function in the most optimized way. In one example, the UPS function may be optimized if equipment having similar power requirement is plugged into the same outlet groups. To preserve power for critical equipment, in one example, it may be beneficial to drop nonessential loads to maximize battery power. For example, by configuring the load shedding parameters to drop the load on a monitor when a power problem arises, the UPS can have the resultant power saving for critical devices.

Accordingly, systems and methods disclosed herein include systems and methods that are configured to make recommendations for connecting one or more devices to one or more UPS outlet groups depending on desired functionality and optimal functionality. In some examples, such a utility can maximize the runtime of the UPS in the event of a power problem and can ensure that the equipment is adequately protected from surges. In addition, the systems and methods can pre-configure the user interface with the recommended shutdown settings, delay times and reboot times where appropriate for that particular device type and usage. Further, the systems and methods can provide flexibility and user configurability by providing an option for the user to edit the preconfigured settings if the user wants to make changes to those settings.

The systems and methods disclosed herein may include an automated utility that is provided to the user as part of the UPS management and control software. By following the visual and interactive configuration steps provided by the utility, the user can properly configure the UPS without having to understand the technical details for outlet group types, shutdown delays and reboot options or the way that equipment is typically used. In addition, the utility can provide preconfigured UPS settings on one single screen, simplifying the input process, and asking the user to provide very little information to correctly configure the sequence and shutdown functionality.

The utility ensures a more accurate configuration and a more reliable shutdown function for the devices attached to the UPS by greatly reducing the dependency on the user's technical understanding of the UPS unit, the terminology used in the management software, and the user interface design. In addition, the utility can provide a much improved user experience by simplifying the user interface and greatly reducing the number of required manual settings, making the configuration process more efficient and effective. The utility greatly reduces the risk from incorrect configuration of the outlet groups, by advising the user of the correct outlet group with the correct pre-configured shutdown settings for the user's device category.

Accordingly, various examples include systems and methods for providing a UPS outlet configuration utility. FIG. 1 illustrates one example of a system that may be used to configure outlets on a UPS. As shown, the example system of FIG. 1 includes a UPS 102 that is powered by a power source 104 and includes a battery 106 as well as a number of outlets, including outlet 108, 110, and 112. The UPS 102 can provide power to various devices or equipment connected to the outlets 108-112 outlets. Such devices include a computer system 114, a monitor 116, a scanner 118, a printer 120, a router 122 or any other piece of equipment. The computer system 114 may include an agent 124 configured to communicate with the UPS over a local communications link, such as USB, RS-232, or another serial or parallel interface. The computer system 114, together with the agent 124 can execute embodiments of a UPS outlet configuration utility 150, as described further below.

Figure 2:
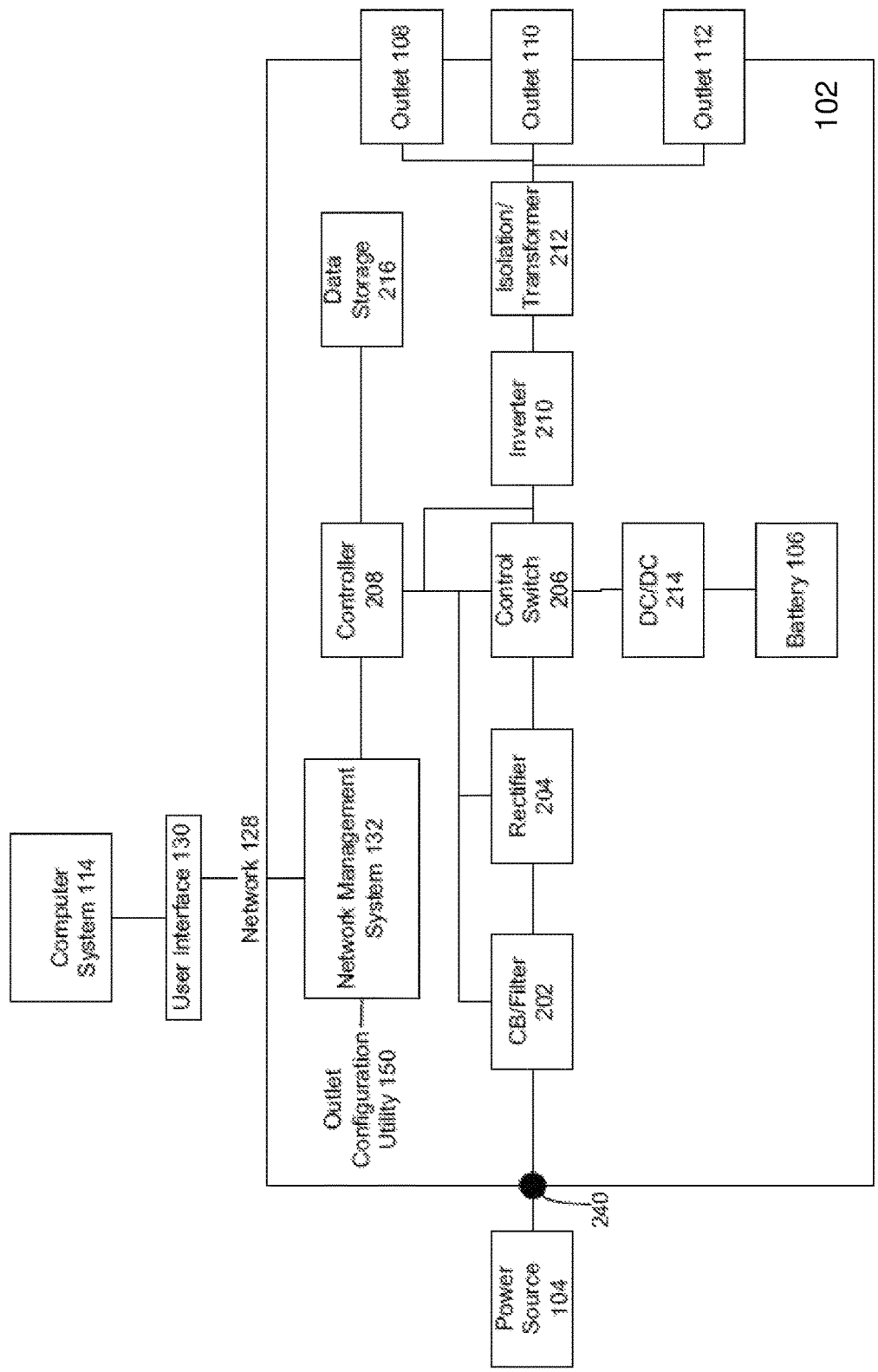
FIG. 2 is a schematic block diagram the UPS illustrated in FIG. 1.

In another embodiment, as shown in FIG. 2, the UPS 102 includes a Network Management System 132 that allows the UPS to communicate with equipment or devices over a computer network 128. The computer system 114 is also connected to the computer network 128. The Network Management System 132 can execute embodiments of the UPS outlet configuration utility 150, as described further below. In this embodiment, various settings on the UPS can be controlled by using an interface 130 that is served by the Network Management System 132.

The outlets 108-112 can provide power either from the power source 104 or from the battery 106 and can be configured to be switched on or off using software configuration settings provided by the Network Management System 132. In some examples, the outlets may be dependent on one main outlet. For example, when outlet 108 is switched off, outlets 110 and 112 may also be switched off. Similarly, outlets 110 and 112 may not be switched on unless outlet 108 is switched on. It is appreciated that any number of outlets may be included in the UPS 102.

FIG. 2 illustrates one example of the UPS 102 which can be used to provide regulated, uninterrupted power in accordance with one embodiment of the disclosure. The UPS 102 includes an input circuit breaker/filter 202, a rectifier 204, a control switch 206, a controller 208, the battery 106, an inverter 210, an isolation transformer 212, a DC/DC converter 214, data storage 216 and a network management interface 132. The UPS also includes an input 240 for coupling to an AC power source, and the outlets 108-112 for coupling to one or more devices or equipment. The devices, such as the devices 114, 116, 118, 120, and 122 described with reference to FIG. 1, are coupled to, and receive power from, one of the outlets 108-112.

The UPS 102 operates as follows. The circuit breaker/filter 202 receives input AC power from the AC power source through the input 240, filters the input AC power and provides filtered AC power to the rectifier 204. The rectifier 204 rectifies the input voltage. The DC/DC converter 214 regulates DC power from the battery 106. The control switch 206 receives the rectified power and also receives the DC power from the DC/DC converter 214. The controller 208 determines whether the power available from the rectifier 204 is within predetermined tolerances, and if so, controls the control switch 206 to provide the power from the rectifier 204 to the inverter 210. If the power from the rectifier 204 is not within the predetermined tolerances, then the controller 208 controls the control switch 206 to provide the DC power from the battery 106 via DC/DC converter 214 to the inverter 210. The power from a rectifier may be outside of predetermined tolerances because of "brown out" or "black out" conditions, or due to power surges.

In the shown embodiment, the controller 208 is coupled to the rectifier 204, the control switch 206 and the inverter 210. The controller 208 is configured to receive information from the rectifier 204 when a "brown out" or "black out" condition occurs. Such a condition may occur when power to the input 240 is terminated. In other embodiments, the controller may be coupled to the other components of the UPS 102 including the input 240, the breaker/filter 12, the isolation transformer 212, the DC/DC converter 214 and/or the battery 106.

The inverter 210 of the UPS 102 receives DC power and converts the DC power to AC power and regulates the AC power to predetermined specifications. The inverter 210 provides the regulated AC power to the isolation transformer 212. The isolation transformer 212 is used to increase or decrease the voltage of the AC power from the inverter 210 and to provide isolation between a load and the UPS 102. The isolation transformer 212 is an optional device, the use of which is dependent on UPS output power specifications. Depending on the capacity of the battery 106 and the power requirements of the load, the UPS 102 can provide power to the load during brief power source dropouts, for extended power outages, or when power to the UPS is otherwise compromised.

Using data stored in the data storage 216, the controller 208 performs one or more instructions or procedures that may result in manipulated data, and the controller monitors and controls operation of the UPS 102. In some examples, the controller 208 may include one or more processors or other types of controllers. In one example, the controller 208 is a commercially available, general purpose processor. In another example, the controller 208 performs a portion of the functions and processes disclosed herein on a general purpose processor and performs another portion using an application-specific integrated circuit (ASIC) tailored to perform particular operations. As illustrated by these examples, embodiments in accordance with the present disclosure may perform the operations and processes described herein using many specific combinations of hardware and software. The disclosure is not limited to any particular combination of hardware and software components.

The data storage 216 stores computer readable information required for the operation of the UPS 102. This information may include, among other information, data subject to manipulation by the controller 208 and instructions that are executable by the controller 208 to manipulate data. Thus, in some embodiments, the data storage 216 can receive and store, or retrieve and provide, this computer readable information. The data storage 216 may include relatively high performance, volatile, random access memory such as a dynamic random access memory (DRAM) or static memory (SRAM), or may include a nonvolatile, non-transitory storage medium such as read-only memory (ROM), magnetic disk, flash memory, CD, DVD or one or more electrical switches, such as a dip switch. In one example, the data storage 216 includes both volatile and non-volatile storage. Various examples in accordance with the embodiment disclosed herein can organize the data storage 216 into particularized and, in some cases, unique structures to perform the aspects and functions disclosed herein. In addition, these data structures may be specifically configured to conserve storage space or increase data exchange performance.

The UPS 102 can gather configuration management information regarding itself and its components, including any installed peripherals or devices. The UPS 102 can store this configuration management information and the associated information in the data storage 216 for later use. Other examples of determining, identifying retrieving, storing of system information about UPS and management information for the load 300 are detailed in U.S. patent application Ser. No. 12/412,883 entitled "SYSTEM AND METHOD FOR GATHERING INFORMATION USING A POWER DEVICE" filed Mar. 27, 2009, which is hereby incorporated herein by reference in its entirety. In one example, the UPS 102 can determine information regarding outlet groups associated with the UPS, including whether the UPS 102 includes a Main Outlet Group and a Switched Outlet Group.

The Network Management System 132 exchanges data with one or more external devices. For example, the Network Management System 132 and the computer system 114 exchange (i.e. transmit or receive) information via the network 128. The network 128 may include any communication network through which computer systems exchange information. For example, the network 128 may be a public network, such as the Internet, and may include other public or private networks such as LANs, WANs, extranets, intranets, and cloud computing systems. Although shown as a single network in FIG. 2, in some embodiments, the network 128 includes a plurality of communication networks.

In the embodiment illustrated in FIG. 2, the Network Management System 132 is configured to implement the user interface in conjunction with the computer systems 114 via the network 128. For example, in some embodiments illustrated by FIG. 2, the user interface is a browser-based user interface served by network management interface. In still other embodiments, the interface is a specialized client program that executes outside of a browser environment, such as an application program executing on a mobile device. The user interface may be implemented using a variety of technologies and may include sundry elements (e.g., screens, windows, buttons, boxes, etc) arranged according to various user interface metaphors.

Information may flow between the components illustrated in FIG. 2, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

The Network Management System 132 may be configured according to a variety of architectures. The architecture illustrated in FIG. 2 is provided for exemplary purposes only and embodiments disclosed herein are not limited to the architecture shown in FIG. 2. For example, in some of the embodiments, the physical components described below may be virtualized.

Outlet Configuration System

Some embodiments disclosed herein implement the outlet configuration utility 150 using one or more computer systems, such as the computer systems described below with reference to FIG. 1 and FIG. 2 and further described in reference to FIG. 5. According to various examples, the outlet configuration utility 150 may provide one or more screens that allow the network management interface to implement the outlet configuration utility 150. It is to be appreciated that many other interface screens may be provided, and embodiments described herein are not limited to a particular interface screen or set of screens.

The outlet configuration utility 150 can provide a visual and interactive interface for the user to connect various devices to the UPS 102. Based on the input from the user, the outlet configuration utility 150 can configure the UPS to be optimally used for the devices and the associated load that is being applied to them. As described above, optimal configuration of the UPS based on the load would normally require advance knowledge of the devices and UPS configurations on the part of the user, which typical UPS users do not possess.

The outlet configuration utility 150 may be executed when the user first launches the UPS management software on a computer system, such as the computer system 114. The display screen such as the display screen shown in FIG. 3 can be shown to the user as part of the outlet configuration utility 150. The outlet configuration utility 150 assists the user with understanding the physical layout of their UPS outlet groups by providing an on-screen visual representation of the UPS model. In one example, the visual representation can include an image of the back of the UPS. Such a visual representation can help the user identify the outlet groups.

Figure 3:
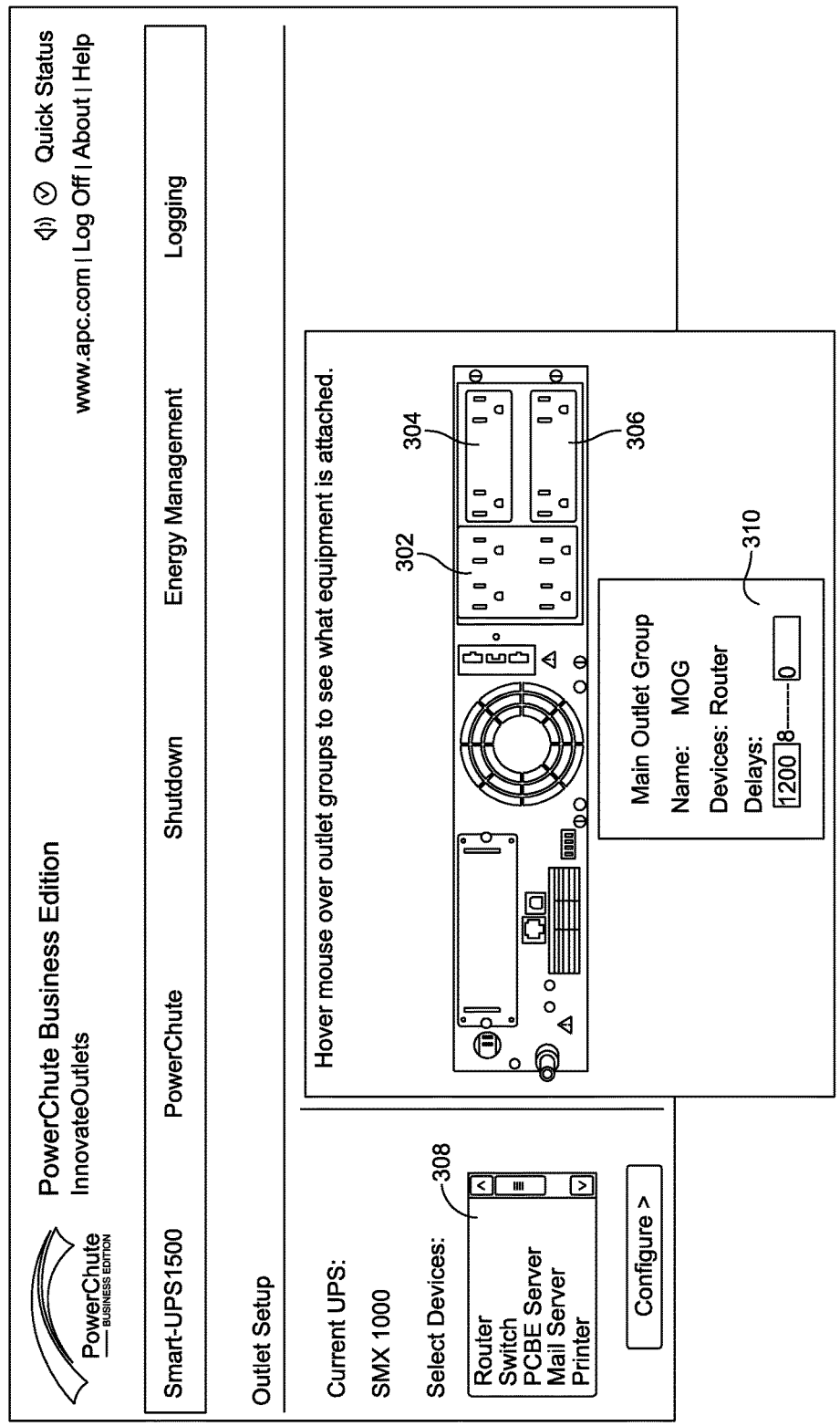
FIG. 3 is an example set of user interface elements provided by one embodiment.

In one example, the visual representation of the UPS model can include a number of outlets grouped together by outlet groups. For example, as shown in FIG. 3, the visual representation can include a first outlet group 302, a second outlet group 304, and a third outlet group 306. Each of the outlet groups can include one or more outlets. Any number of outlets may be included in each outlet group. In one example, the first outlet group 302 is the main outlet group (or MOG), while the second and the third outlet groups 304 and 306 are Switched Outlet Groups (or SOG). Other types of outlet groups can be used in various embodiments. In some examples, the outlet groups can be color-coded for users to more easily identify each of the groups.

The outlet configuration utility 150 can provide for the user to select the device type which the user intends to connect to the UPS 102. For example, as shown in FIG. 3, the outlet configuration utility 150 can provide a selection menu 308 including a list of devices the user can connect to the UPS 102. In one example, the users can add one or more devices to the predefined list by creating a new device and associating it with an outlet group configuration profile.

In one example, the outlet configuration utility 150 can provide a series of additional screens that may provide for the user to identify the device from a list of devices stored in the data storage 216. Each of the devices on the list can be associated with a device profile, which may store information pertaining to the device. For example, the device profile can include device name, device make and model, device type, power requirements associated with the device in active and stand-by mode, as well as other information associated with the device.

In response to the selection of the device, the outlet configuration utility 150 can determine to which outlet group the device should be assigned based on the outlet configuration process 400, as described further below. The outlet configuration process includes a set of predetermined device profiles and associated predetermined rules associated with assigning devices to those profiles, which can result in the most optimal profile determined for each device. In one embodiment, the profiles define a 'type' of device and its associated delays and settings.

The outlet configuration utility 150 can then provide instructions to the user indicating the outlet group for attaching the device. The outlet configuration utility 150 can also pre-configure the most appropriate shutdown and reboot settings for the particular device. The optimal shutdown and reboot settings are further described below. The automatic configuration process is more efficient and more effective, with less input needed from the user. Typical software requires the customer to manually and correctly enter many settings on one or more screens so that the software behaves as the customer expects. Instead, the outlet configuration utility 150 reduces risks to the critical load from misunderstandings of the UPS technical components or concepts and the power requirements of the connected devices.

The outlet configuration utility 150 can provide for the user to accept the proposed outlet group and the pre-configured outlet group settings provided to the user, based on the device selected. In response to the user acceptance, the outlet configuration utility 150 can update the visual representation of the specific UPS model with the device attached. The device information can be displayed in one or more outlet group information panels, such as the panel 310, with one panel displayed for each outlet group. Additional outlet group information can be editable through one of the panels, such as the name of the outlet group, and which outlet group is powering the Server.

For example, as shown in FIG. 3, the device "router" is proposed to be connected to the Main Outlet Group. Once accepted by the user, the router is shown as one of the connected devices in the Main Outlet Group. In one example, the user can "hover over" the visual representation of the UPS to identify which devices are attached to each outlet group. For example, by hovering over the Main Outlet Group 302 on the visual representation, the user can see the "router" listed as a connected device in the Main Outlet Group, and also see the pre-configured settings for that outlet group including the delays.

In one embodiment, if one or more of the devices are already attached to the UPS 102, the outlet configuration utility 150 can provide for the user to select the outlet group to which the devices are attached. The outlet configuration utility 150 can determine if the attached devices should be attached to another outlet group and can provide for the user instructions to reconnect the devices to another outlet group. In one example, the re-configuration of equipment can avoid unintended consequences that might occur if the user connected equipment that is not appropriate to particular outlet groups.

For example, the user connects a device to the Main Outlet Group, which should be connected in the Switched Outlet Group. The re-configuration provided by the outlet configuration utility 150 can result in better alignment of the load, further resulting in extra runtime for the UPS. For example, if the user had connected a router and a monitor to the same outlet group, the outlet configuration utility 150 can recommend moving the monitor to a different outlet group so that it can be powered off after a power outage and leave longer runtime for the router. In one example, the user may need to power down the UPS and reconfigure the equipment that is connected to the UPS.

Once the devices are connected to the proper outlets, the UPS is set up to be run most efficiently and effectively. According to various examples, the devices connected to the proper outlets can allow the UPS and the management software to keep the load up as long as possible and safely shut down loads that are sensitive to how they are shut down. It is appreciated that the UPS runtime is a precious commodity. Devices configured effectively and efficiently to the UPS result in increased UPS runtime as compared to typical device to outlet configuration.

The outlet configuration utility 150, according to various examples described here, increases runtime by dropping loads as soon as possible based on the type of device connected. Some examples of outlet configuration utility 150 being configured to drop loads include, dropping the monitor after a short time to preserve runtime for a more critical device, such as a computer with vital remote connectivity.

The outlet configuration utility 150 can be configured for, and used in, a number of environments. According to one example, the outlet configuration utility 150 can be used in a small business/office environment, using the UPS to prevent downtime and loss due to power outages. The UPS device used for this application can typically include three outlets groups, including a main outlet group and two switched outlet groups. The IT equipment that may be connected to the UPS may include a web server, an email server, a router, a printer, a scanner, a photocopier, one or more desktop computers, and one or more monitors. The user configuring the UPS, may have some IT knowledge, and may connect the IT equipment in turn to the UPS.

In this example, the outlet configuration utility 150 identifies the web and mail servers as belonging to Profile 1, devices which require a graceful shutdown. The outlet configuration utility 150 can assign this Profile to Outlet Group 1 with the preconfigured UPS and delay settings and can advise the user to connect the server to Outlet Group 1. In addition, the outlet configuration utility 150 can identify the router (perhaps the most important piece of equipment due to its provision of local network and internet connectivity) as belonging to Profile 2, which may include devices that must stay on for as long as possible and must be attached to the Main outlet group using the appropriate pre-configured UPS and delays settings. The outlet configuration utility may advise the customer to connect their router to the main outlet group. The outlet configuration utility 150 can identify the printer and scanner as belonging to Profile 3, which includes devices that can be turned off with minimal delay and no graceful shutdown. It assigns Profile 3 to Outlet Group 2 with the appropriate pre-configured UPS and delay settings and advises the customer to connect the server to Outlet Group 1. The outlet configuration utility 150 can identify the desktop computers as belonging to Profile 1 and advises the customer to connect the desktop computer to remaining sockets in Outlet Group 1. The outlet configuration utility 150 can identify the monitors as belong to Profile 4, non-critical devices which can be turned off immediately. Once all outlet groups are configured, the wizard advises the customer to connect the monitors to Outlet Group 2.

The most important IT equipment for this business is connected to the Main Outlet Group and Outlet Group 1 by the outlet configuration utility 150. Outlet configuration utility 150 also configures shutdown settings and so the Main Outlet Group and Outlet Group 1 will shutdown gracefully if necessary. This business can safely power down outlet group 2 containing the non-essential equipment at any time to reduce energy costs without any impact on their main business activities. In addition, during power outages, the business can preserve power for the critical loads so that the critical loads are powered for longer durations and are, perhaps in some instances, powered by the UPS for the duration of the power outage.

The outlet configuration utility 150 can also be used in a family home to reduce the impact of a power loss on their personal home computing equipment, minimizing disturbance to the enjoyment of high-spec and valuable entertainment equipment. For example, a family home can include a high-spec home computer (used for personal business, education, research and entertainment), router, and printer, a satellite television setup consisting of a recorder and player, an electronic games system, and a high-spec independent audio stereo system.

The household user can be a person with very little knowledge of electrical equipment, and can determine that there are three categories of equipment ranging from most critical, category 1 to least critical, category 3. Category 1 can include the router, satellite television equipment, and the home computer. Loss of power to this category may result in the loss of personal data not saved to their home computer, loss of home network and internet connectivity, and may have a negative impact on the family's enjoyment of their satellite television recorder/player system. Category 2 can include independent audio and stereo systems and electronic games systems, which can be powered down without any major impact on the entire family. Category 3 can include the least critical equipment, possibly including printers and computer monitors.

The household user can install the outlet configuration utility 150 on a home computer. According to one example, the outlet configuration utility 150 advises the user, both in text and graphical format, that the router belongs to its most critical profile. Consequently, the router should be connected to the main outlet on their UPS so that the router and other equipment connected to this group will be kept on as long as possible during a power loss. Now informed of this recommendation, the user also connects the router, the satellite television equipment and personal computer to the remaining sockets in the main outlet group. Thus, under this configuration during a power outage, the user may access the internet via the router, for example via a mobile device running on battery power, and the television equipment may record entertain for viewing after the power outage.

However, once the user inputs into the outlet configuration utility 150 that the user is connecting a computer, the outlet configuration utility 150 can identify the computer as belonging to Profile 2 and recommend moving the computer from the Main Outlet Group to Outlet Group 1. As a result, this computer can be configured to shutdown gracefully after a recommended delay time to allow saving any data prior to shutdown. This corrective action can reduce power consumption by non-critical equipment on their UPS while running in battery power and thereby allowing the UPS to continue powering more vital equipment for longer time periods. The user takes corrective action by moving the computer to the Outlet group 1.

The outlet configuration utility 150 can also provide instructions to advise the user that the printer is a non-critical device that can be shut down immediately during a power loss, and provide instructions that the printer should be connected to Outlet Group 2. Realizing this new information, the household user also connects the computer monitor to Outlet Group 2.

The remaining equipment consists of electronic games systems and audio/stereo systems. These devices are important, but non-critical, to the family's lifestyle and they wish for these items to be properly powered down during a power disruption in their home. The household user now has a better understanding of the outlets on their UPS and the shutdown profiles attached to each outlet group. The household connects his remaining entertainment equipment to the unused sockets in Outlet Group 1. Overall the householder has received a better understanding of their UPS and shutdown profiles via the textual and graphical information. The household user's equipment is now better protected, while also making more efficient use of their UPS and overall energy consumption.

Outlet Configuration Profiles

As described above, the outlet configuration utility 150 associates a profile to each of the devices connected to the UPS 102. The configuration profiles can be stored on the data storage 216 and can be accessed by the Network Management system 132. The profiles, according to various examples, are used to assign devices to one or more outlet groups. Some examples of outlet profiles are described below with reference to Table 1. However, it is appreciated that other profiles may be defined according to other examples and may include other configuration settings.

Table 1, according to some examples, provides four categories of equipment that could be powered by a UPS, each type with different requirements in terms of delays, graceful shut downs, preferred outlet groups and load shedding characteristics. In one example, sequencing of load shedding and shut downs is ensured by setting different turn-off, stay-off and turn-on delays for each profile. In one example, graceful shutdown transitions a computer system from a running state to a shutdown state, allowing applications in process on the computer system to be suspended or turned off naturally, rather than forcefully. In some examples, load shedding may refer to turning off power to a particular outlet group if certain conditions are met. For example, power can be turned off when time on battery exceeds a certain time, remaining runtime while on battery falls below a particular period of time, or a UPS overload condition exists.

In this example, the four profiles are defined in order of priority, with the highest priority listed first in Table 1. The priority is used by the process 400, for example, if there are more profiles than outlet groups. Table 1, as shown, also provides examples of devices that are associated with each profile, typical characteristics of these devices, and the settings made to outlet groups that are given the profile. It is appreciated that other profiles may be defined for other types of devices, including different priority information assigned to each of the profiles.

During set up of devices, the method 400 determines which of the profiles to assign to the device. The method 400 can also provide instructions for the user to plug in a device in the preferred outlet group. For example, these instructions might be provided by displaying the outlet group on the visual representation of the UPS as described above with reference to FIG. 3.

According to some examples, if the UPS device has fewer outlet groups than outlet profiles, the method 400 below can ensure that devices with the lowest priority profile share an outlet group with those devices with the next lowest priority. This may ensure that the more critical equipment is configured correctly. The method 400 can also ensure that devices with a preference for the main outlet group are assigned to that outlet group.

TABLE 1

| Priority | Profile | Description | Devices | Characteristics | Outlet Group Delays |
|---|---|---|---|---|---|
| Highest | 1. Critical devices that require graceful shutdown | This profile is for critical equipment that needs enough runtime to allow for a graceful shutdown. | Server protected by PowerChute software. | Devices can be on any Outlet Group There should be enough runtime to allow for a graceful shutdown of the server. Load Shedding: Do not Load Shed. PowerChute Outlet Group indicator is set. | Turn off delay: 180 seconds<br><br>Stay off delay: 8 seconds<br><br>Turn on delay: 0 seconds |
| | 2. Critical devices that stay on | This profile is for critical equipment that needs to stays on as long as possible | Router, Switch | Devices should be placed on a Main Outlet Group if it exists on the UPS Set to maximum runtime and don't include in shutdown command Load Shedding: Do not Load Shed. | Turn off delay: 1200 seconds<br><br>Stay off delay: 8 seconds<br><br>Turn on delay: 0 seconds |
| | 3. Devices that can be turned off with minimal delay and no graceful shutdown | This profile is for non-critical equipment that needs a short time to shut down. Minimal Turn on delay gives more critical equipment the chance to turn on first. | Scanner, Printer | Any Outlet Group Minimal Turn off and Turn on delays Load Shedding: Load Shed immediately, use Turn Off Delay. | Turn off delay: 60 seconds<br><br>Stay off delay: 8 seconds<br><br>Turn on delay: 60 seconds |
| Lowest | 4. Devices that can be turned off immediately | This profile is for non-critical equipment that can be turned off immediately. Minimal Turn on delay gives more critical equipment the chance to turn on first. | Monitor | Any Outlet Group No turn off delay Minimal Turn on delay Load Shedding: Load Shed immediately, do not use Turn Off Delay. | Turn off delay: 0 seconds<br><br>Stay off delay: 8 seconds<br><br>Turn on delay: 60 seconds |

In one example, the profiles may include a "Critical Devices with Graceful Shutdown" profile or the CGS profile. The CGS profile may be associated with critical equipment that needs enough runtime to allow for a graceful shutdown. The devices associated with the profile can be connected to any outlet group. The load shedding properties of CGS profile can include settings that prevent the load from being shed. Other pre-configured settings can include the turn-off delay of 180 seconds, the stay-off delay of 8 seconds, and the turn-on delay of 0 seconds. One example of a device to which this profile can be assigned includes a Server executing UPS management software.

In at least one example, the profiles can include a "Critical Devices Stay On" profile or the CSO profile. The CSO profile may be associated with critical equipment that needs to stay on as long as possible. The devices associated with the CSO profile can be connected to the Main Outlet Group if the group is available on the UPS 102. The CSO profile can includes settings that allow for maximum runtime and do not include the devices in this profile as part of the shutdown command. The load shedding properties of CGS profile can include settings that prevent the load from being shed. Other pre-configured settings can include the turn-off delay of 1200 seconds, the stay-off delay of 8 seconds, and the turn-on delay of 0 seconds. Examples of devices to which this profile can be assigned include routers and switches. As described above, such devices can be essential in allowing remote connectivity or networked alert functions.

In at least one example, the profiles can include a "Turned Off with Minimal Delay, No Graceful Shutdown" profile or the TOMD profile. The TOMD profile may be associated with non-critical equipment that needs a short time to shut down. Minimal turn-on delay gives more critical equipment the chance to turn on first. The devices associated with the TOMD profile can be connected to any outlet group. The TOMD profile can include settings that allow for minimal turn-off and turn-on delays. The load shedding properties of TOMD profile can include settings that shed load immediately, and use a turn-off delay. Other pre-configured settings can include the turn-off delay of 60 seconds, the stay-off delay of 8 seconds, and the turn-on delay of 60 seconds. Examples of devices to which this profile can be assigned include scanners and printers.

In at least one example, the profiles can include an "Immediate Shutdown" profile or the IS profile. The IS profile may be associated with non-critical equipment that can be turned off immediately. Minimal Turn on delay gives more critical equipment the chance to turn on first. The devices associated with the IS profile can be connected to any outlet group. The IS profile can include settings that allow for no turn-off and minimal turn-on delays. The load shedding properties of IS profile can include settings that shed load immediately, and do not use a turn-off delay. Other pre-configured settings can include the turn-off delay of 0 seconds, the stay-off delay of 8 seconds, and the turn-on delay of 60 seconds. One example of a device to which this profile can be assigned includes a monitor.

According to one example, the outlet configuration utility 150 can provide for the user to edit the default configuration profiles for device types, as described further below. In one example, the user can edit one or more settings such as the profile type, the shut down sequence and the delay associated with the profile. In another example, the outlet configuration utility 150 can provide for the user to create new/additional configuration profiles and associate devices with the new/additional profile.

Outlet Configuration Method

Figure 4:
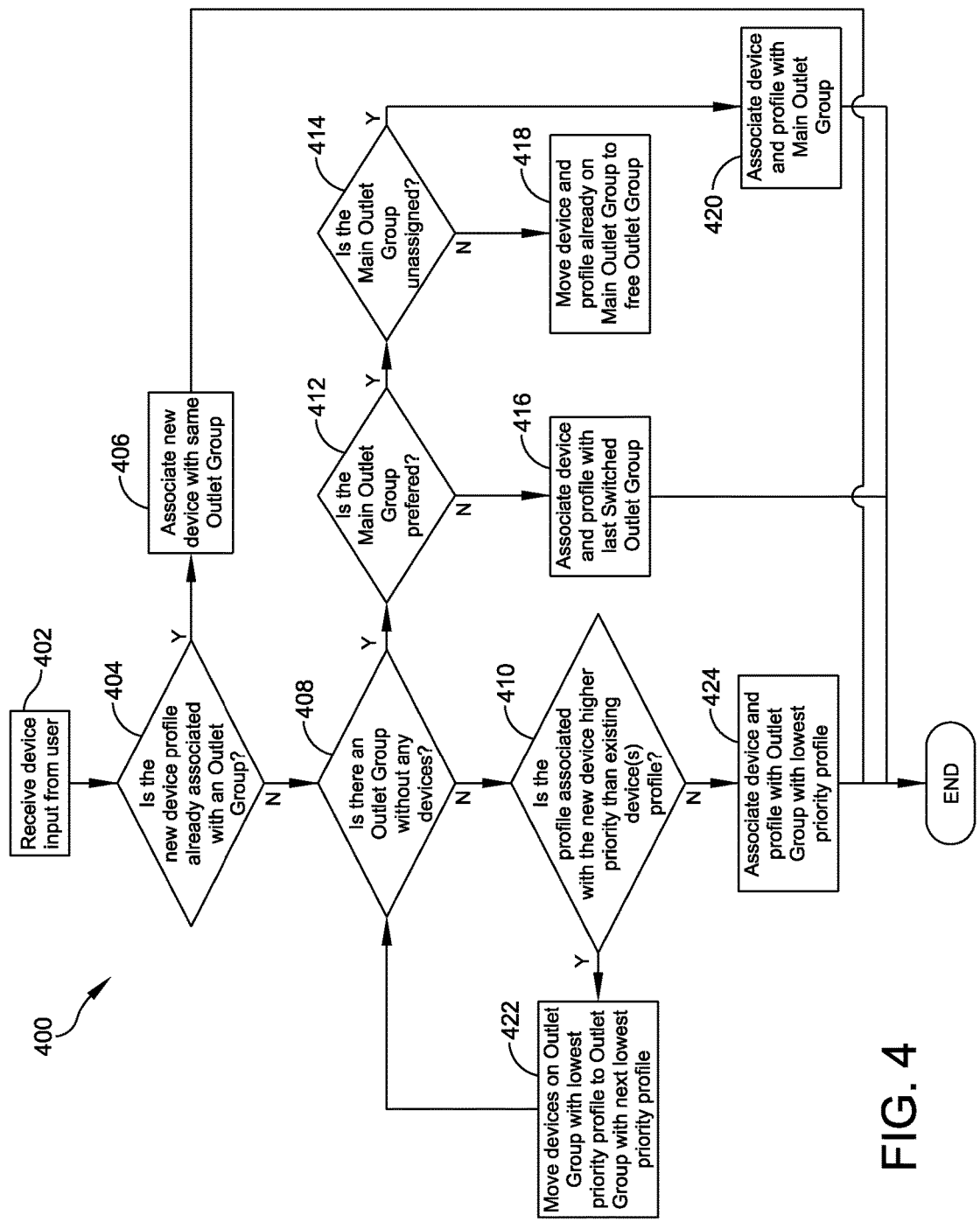
FIG. 4 is a flow diagram illustrating a process of associating outlet profiles according to an embodiment.

In some embodiments processes are performed that configure the UPS outlet group using an outlet configuration utility executed on a computer system, such as the outlet configuration utility 150 executed on the computer system 114, described above with reference to FIGS. 1, 2 and 3. One example of determining an outlet profile to associate with a particular device is method 400 illustrated in FIG. 4. It is appreciated that method 400 can ensure that the higher the priority of a device, the more likely it is to have its own outlet group. This means a higher priority device is more likely to have the delays it requires than a lower priority device. Method 400 may be performed for each device that is selected by the user as discussed in FIG. 3.

At block 402, the computer system receives a selection from a user of a device that the user wants to connect to the UPS. The selection regarding the device can be input by the user via a user interface, such as the user interface 130. The computer system determines which of the configuration profiles are to be associated with the device. For example, the computer system receives input from the user of a router device. The computer system can also determine information pertaining to the outlet groups associated with the UPS, for example whether a Main Outlet Group exists for the UPS.

At block 404, if that profile is already associated with an outlet group and the outlet group includes a free outlet, then the method proceeds to block 406 where the device is assigned to that outlet group and the method 400 ends. At block 404, if the associated configuration profile is not already associated with an outlet group or the outlet group does not include a free outlet, then the method proceeds to block 408. At block 408, the computer system determines whether a free outlet group exists. A free outlet group may include an outlet group without any devices associated with that outlet group. If the computer system determines that there is no free outlet group at this point, the method proceeds to block 410.

At block 410, the computer system determines the priorities of the configuration profiles, already associated with outlet groups and identifies the lowest and next lowest priority of the outlet groups, as described above with reference to Table 1. At block 422, if the computer system determines that the profile associated with the new device includes a priority higher than the priority associated with existing profiles for a device or devices, then the computer system moves devices associated with the particular outlet group having the lowest priority profile to an outlet group with the next lowest priority profile. In this way, the computer system may create a free outlet group for later association with the profile. The method then proceeds to block 408 to determine if there is an outlet group without any devices.

At block 424, if the computer system determines that the profile associated with the new device does not include a priority higher than priority associated with existing profiles for device or devices, the computer system associates the device and profile with the outlet group with the lowest priority level and the method ends.

At block 412, the computer system determines whether the profile associated with the current device expresses a preference for installation on the Main Outlet Group. In some examples, this act is carried out only if the computer system determines that a Main Outlet Group exists for the UPS. If the Main Outlet Group is preferred, the method proceeds to block 414. If the Main Outlet Group is not preferred, the method proceeds to block 416.

At block 414, the method determines whether the Main Outlet Group has any devices assigned to it. If there are any assigned devices, the computer system moves any devices from the Main Outlet Group to the free Outlet Group, in block 418. The method then proceeds to block 420 where the computer system associates the new profile and associated devices with the Main Outlet Group and the method ends.

At block 416, if the profile associated with the current device does not have a preference for installation on the Main Outlet Group, the computer system applies the current profile and device to the free Switched Outlet Group and the method ends. In some examples, the computer system factors in the number of outlets per Outlet Group to ensure that it does not over subscribe or over assign devices to a particular outlet group. For example, if an outlet group only has two outlets, then the computer system does not allocate three devices to that particular outlet group.

According to some embodiments, the computer system can also automatically rename outlet groups based on the devices assigned to them. For example, if only one device is assigned to an outlet group, the device name can be used for that outlet group. In this example, if more than one device is assigned to an outlet group and the devices have the same associated configuration profile, then a simplified version of the profile name can be used. The profile names can include Graceful Off, Always On, Off Short Delay, and Off Immediately. It is appreciated that any profile naming scheme can be used. If more than one device is assigned to an Outlet Group and the devices do not have the same associated configuration profile, then the computer system may not alter the name.

Once the computer system determines the profile and the outlet group for the device, the computer system can display the device associated with the assigned outlet group in the visual representation of the UPS, as described above with reference to FIG. 3. The configuration setting associated with the device can also be displayed by the computer system, for example in one or more panels associated with the visual representation of the UPS.

The process 400 depicts one particular sequence of acts in a particular example. Some acts are optional and, as such, may be omitted in particular examples in accordance with the embodiments disclosed herein. Additionally, the order of acts can be altered, or other acts can be added, without departing from the scope of the embodiments disclosed herein. As discussed above, in at least some examples, the acts deal with data representative of tangible objects. In addition, as discussed above, in at least one example, the acts are performed on a particular, specially configured machine, namely an on-line UPS. Embodiments may be used with other UPS topologies, including off-line and line interactive UPSs such as Smart UPSs and other topologies.

Computer System

As discussed above with regard to FIGS. 1 and 2, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
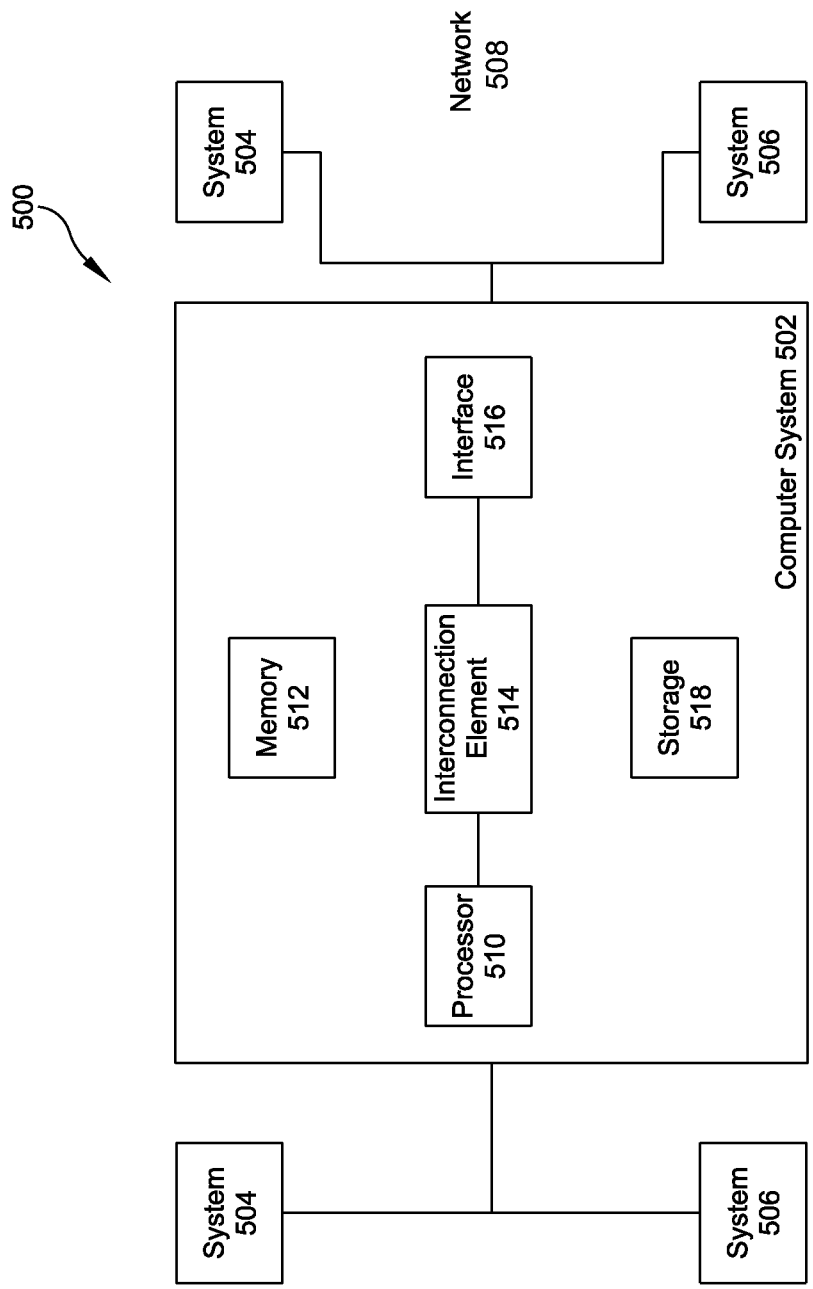
FIG. 5 is a schematic block diagram of a distributed computer system according to an embodiment.

Referring to FIG. 5, there is illustrated a block diagram of a distributed computer system 500, in which various aspects and functions are practiced. As shown, the distributed computer system 500 includes one more computer systems that exchange information. More specifically, the distributed computer system 500 includes computer systems 502, 504 and 506. As shown, the computer systems 502, 504 and 506 are interconnected by, and may exchange data through, a communication network 508. The network 508 may include any communication network through which computer systems may exchange data. To exchange data using the network 508, the computer systems 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions and processes disclosed herein, the processor 510 performs a series of instructions that result in manipulated data. The processor 510 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical busses, for example, busses between components that are integrated within a same machine, but may include any communication coupling between system elements including specialized or standard computing bus technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 2000 (Windows ME), Windows XP, Windows Vista or Windows 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Implementation Examples

Figure 6:
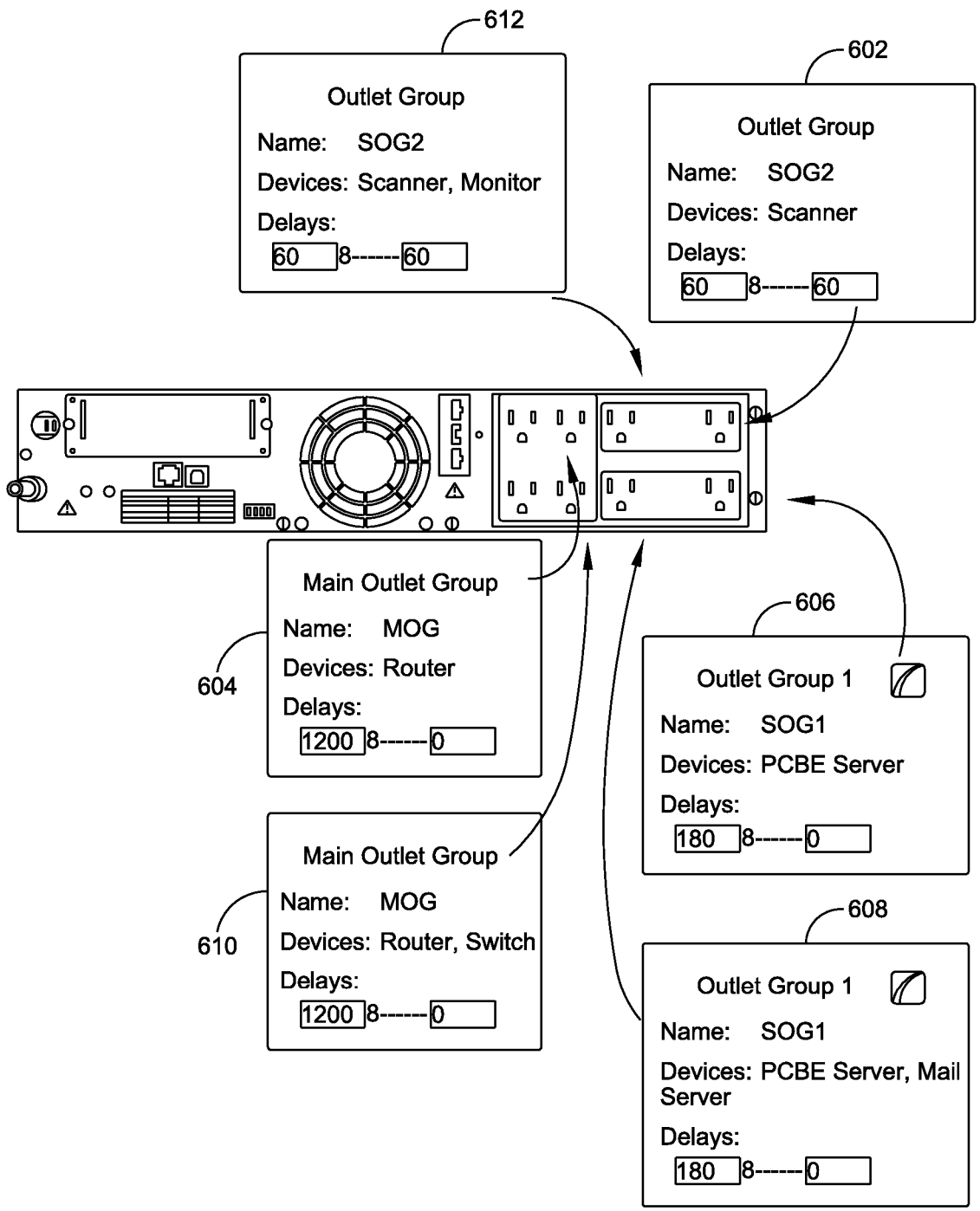
FIG. 6 is an illustration of a process associating outlet profiles with reference to UPS outlets.

FIG. 6 illustrates examples of the method 400 as it applies to different devices and the devices are assigned to profiles and outlet groups. FIG. 6 shows one example of devices assigned to outlet groups associated with a UPS device, such as the UPS device SMX1000 which include a Main Outlet Group and two Switched Outlet Groups.

In one example, a scanner 602 is assigned to the Switched outlet Group 2. The scanner's associated profile is Non Critical Load Non Graceful Shutdown Minimal Delay and is not already associated with an Outlet Group. The method determines that it is an Outlet Group without any devices and the Main Outlet Group is not preferred by the associated profile, so the Scanner is applied to the last free Switched Outlet Group.

In another example, a router 604 is assigned to the Main outlet Group. The router's profile is the Critical Load Always On profile, which is not already associated with an Outlet Group. The method determined that there is an Outlet Group without any devices. The Main Outlet Group is preferred by the associated profile so the Router 604 is applied to the free Main Outlet Group.

In a further example, the UPS management server 606 (e.g. PowerChute Business Edition Server) is assigned to the Switched Outlet Group 1. The UPS management server's profile is the Critical Load Graceful Shutdown profile and is not already associated with an Outlet Group. There is an Outlet Group without any devices. The Main Outlet Group is not preferred by the associated profile so the UPS management server 606 is applied to the last free Switched Outlet Group.

In yet another example, the Mail Server 608 is assigned to Switched Outlet Group 1. The Mail Server's profile (Critical Load, graceful shutdown) is already applied to Switched Outlet Group 1 so the Mail Server 608 is applied to the same Outlet Group. The switch 610 is assigned to the main outlet group. The switch's profile (Critical Load, Always On) is already applied to the Main Outlet Group so the Switch is applied to the same Outlet Group.

In one example, the monitor 612 is assigned to the Switched Outlet Group 2. The device's profile (Non Critical Load Non Graceful Shutdown No Delay) is not already associated with an Outlet Group. There is not an Outlet Group without any devices. The associated profile has a lower priority than any currently assigned devices so the Monitor 612 is added to the Outlet Group with the lowest priority configuration profile.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one example, it is to be appreciated various alterations, modifications, and improvements will readily occur to those skilled in the art. Such alterations, modifications, and improvements are intended to be part of this disclosure, and are intended to be within the scope of the embodiments disclosed herein. Accordingly, the foregoing description and drawings are by way of example only.

The invention claimed is:

1. A system for configuring outlet groups on an uninterruptible power supply (UPS), the system comprising:
    a computer system connected via a communication link to the UPS, wherein the computer system includes:
        a memory;
        at least one processor coupled to the memory, the at least one processor configured to:
            receive data pertaining to at least one device;
            receive data pertaining to a plurality of outlet groups associated with the UPS;
            determine one configuration profile for the at least one device, the one configuration profile being included in a plurality of configuration profiles;
            determine one outlet group of the plurality of outlet groups, the one outlet group being configured for the one configuration profile;
            associate the one configuration profile with the one outlet group; and
            provide an instruction for a user to connect the at least one device in an outlet included in the one outlet group.

2. The system of claim 1, wherein the at least one processor is configured to display a visual representation of the UPS to the user, the visual representation including a visual representation of the plurality of outlet groups, the visual representation of the plurality of outlet groups including at least one visual representation of an outlet of at least one outlet group of the plurality of outlet groups.

3. The system of claim 2, wherein the at least one processor is configured to provide the instruction for the user to connect the at least one device in the outlet via the visual representation.

4. The system of claim 1, wherein the at least one processor is configured to associate at least one of a plurality of priority levels with at least one of the plurality of configuration profiles, wherein the plurality of priority levels ranges from a lowest priority level to a highest priority level.

5. The system of claim 1, wherein the plurality of configuration profiles includes configuration settings, the configuration settings including at least one of critical load information, graceful shutdown information, turn-on delay information, stay-off delay information and turn-off delay information.

6. The system of claim 1, wherein the at least one processor is configured to:
    determine whether a first outlet group and a second outlet group are associated with at least one profile of the plurality of configuration profiles, wherein the second outlet group is dependent on the first outlet group.

7. The system of claim 6, wherein the at least one processor is configured to:
    determine whether the first outlet group is preferably assignable by the one configuration profile; and
    associate the at least one device with the first outlet group, if the first outlet group is preferably assignable by the one configuration profile.

8. The system of claim 1, wherein the at least one processor is configured to:
    determine whether the one configuration profile is already associated with an outlet group of the plurality of outlet groups; and
    associate the at least one device with the outlet group, if the one configuration profile is already associated with the outlet group.

9. The system of claim 1, wherein the at least one processor is configured to:
    determine whether at least one free outlet group is included in the plurality of outlet groups; and
    associate the at least one device with the at least one free outlet group, if there is at least one free outlet group in the plurality of outlet groups.

10. The system of claim 9, wherein the at least one processor is configured to associate another device already assigned to the one outlet group to another outlet group, if there are no free outlet groups in the plurality of outlet groups and the another device has a lower priority level than the at least one device.

11. A method for configuring outlet groups on an uninterruptible power supply (UPS), the method comprising:
    receiving data pertaining to at least one device;
    receiving data pertaining to a plurality of outlet groups associated with the UPS;
    determining, by a processor, one configuration profile for the at least one device, the one configuration profile being included in a plurality of configuration profiles;
    determining, by the processor, one outlet group of the plurality of outlet groups configured for the one configuration profile;
    associating the one configuration profile with the one outlet group; and
    providing an instruction for a user to connect the at least one device in an outlet included in the one outlet group.

12. The method of claim 11, further including:

displaying a visual representation of the UPS to the user, the visual representation including a visual representation of the plurality of outlet groups, the visual representation of the plurality of outlet groups including at least one visual representation of an outlet of at least one outlet group of the plurality of outlet groups; and providing the instruction for the user to connect the at least one device in the outlet via the visual representation.

13. The method of claim 11, further including associating a plurality of priority levels with the plurality of configuration profiles, wherein the plurality of priority levels ranges from a lowest priority level to a highest priority level.

14. The method of claim 11, further including configuring the plurality of configuration profiles to include configuration settings, the configuration settings including at least one of critical load information, graceful shutdown information, turn-on delay information, stay-off delay information and turn-off delay information.

15. The method of claim 11, further including determining whether a first outlet group and a second outlet group are associated with at least one profile of the plurality of configuration profiles, wherein the second outlet group is dependent on the first outlet group.

16. The method of claim 11, further including:

determining whether the first outlet group is preferably assignable by the one configuration profile; and associating the at least one device with the first outlet group, if the first outlet group is preferably assignable by the one configuration profile.

17. The method of claim 11, further including:

determining whether the one configuration profile is already associated with an outlet group of the plurality of outlet groups; and associating the at least one device with the outlet group, if the one configuration profile is already associated with the outlet group.

18. The method of claim 11, further including:

determining whether at least one free outlet group is included in the plurality of outlet groups; and associating the at least one device with the at least one free outlet group, if there is at least one free outlet group in the plurality of outlet groups.

19. The method of claim 18, further including associating another device already assigned to the one outlet group to another outlet group, if there are no free outlet groups in the plurality of outlet groups and the another device has a lower priority level than the at least one device.

20. A non-transitory computer readable medium having stored thereon sequences of instruction for configuring outlet groups on an uninterruptible power supply (UPS), including instructions that will cause a processor to:

receive data pertaining to at least one device;

receive data pertaining to a plurality of outlet groups associated with the UPS;

determine one configuration profile for the at least one device, the one configuration profile being included in a plurality of configuration profiles;

determine one outlet group of the plurality of outlet groups configured for the one configuration profile;

associate the one configuration profile with the one outlet group; and provide an instruction for a user to connect the at least one device in an outlet included in the one outlet group.

* * * * *